US012627425B2

(12) United States Patent
Bouttier et al.

(10) Patent No.: US 12,627,425 B2
(45) Date of Patent: May 12, 2026

(54) METHOD, DEVICE AND SYSTEM FOR CONFIGURING COMMUNICATION LINK USED FOR EXCHANGING DATA RELATED TO COOPERATIVE CONTROL ALGORITHM

(71) Applicant: MITSUBISHI ELECTRIC CORPORATION, Tokyo (JP)

(72) Inventors: Arnaud Bouttier, Rennes Cedex (FR); Julien Guillet, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 441 days.

(21) Appl. No.: 18/283,331

(22) PCT Filed: Oct. 12, 2021

(86) PCT No.: PCT/JP2021/038332
§ 371 (c)(1),
(2) Date: Sep. 21, 2023

(87) PCT Pub. No.: WO2022/215290
PCT Pub. Date: Oct. 13, 2022

(65) Prior Publication Data
US 2024/0187156 A1     Jun. 6, 2024

(30) Foreign Application Priority Data

Apr. 8, 2021    (EP) ..................................... 21305452

(51) Int. Cl.
*H04L 5/00*          (2006.01)
*G05D 1/00*          (2024.01)
(Continued)

(52) U.S. Cl.
CPC ....... *H04L 5/0035* (2013.01); *H04W 28/0236* (2013.01); *H04W 28/0861* (2023.05)

(58) Field of Classification Search
CPC ............ H04L 5/0035; H04W 28/0861; H04W 28/0236
(Continued)

(56) References Cited

U.S. PATENT DOCUMENTS

2018/0120861 A1* 5/2018 Saxena ................ G05D 1/0291
2020/0241541 A1* 7/2020 McCawley ........... B60W 30/16
(Continued)

OTHER PUBLICATIONS

Hao et al, "Topology optimised fixed-time consensus for multi-UAV system in a multipath fading channel", IET Communications, 2020, vol. 14 Iss. 11, pp. 1730-1738 (Year: 2020).*
(Continued)

*Primary Examiner* — Xuan Lu
(74) *Attorney, Agent, or Firm* — Birch, Stewart, Kolasch & Birch, LLP

(57) ABSTRACT
The present disclosure relates to a method for configuring communication links between a plurality of communicating nodes. wherein the communication links are used for exchanging data related to a cooperative control algorithm, wherein the communicating nodes are arranged according to a regular formation, said method comprising: —selecting a candidate neighbor node communication pattern for the regular formation and a candidate value of at least one communication parameter; —determining a candidate communication performance profile; —estimating a control performance level of the cooperative control algorithm; —estimating an interference level generated by the communicating nodes; wherein different control performance levels and different interference levels are estimated for different candidate neighbor node communication patterns and different candidate values of the at least one communication parameter until a predetermined control performance criterion and a predetermined interference criterion are both satisfied.

15 Claims, 4 Drawing Sheets

(51) Int. Cl.
  *H04W 28/02*    (2009.01)
  *H04W 28/086*    (2023.01)
  *H04W 84/18*    (2009.01)

(58) Field of Classification Search
  USPC ........................................................ 370/329
  See application file for complete search history.

(56) References Cited

U.S. PATENT DOCUMENTS

2020/0351906 A1\* 11/2020 Chen ........................ H04W 8/22
2024/0229732 A1\* 7/2024 Abrosimov ......... B61L 15/0058

OTHER PUBLICATIONS

Hao et al., "Topology optimised fixed-time consensus for multi-UAV system in a multipath fading channel", IET Communications, The Institution of Engineering and Technology, GB, vol. 14, No. 11, 2020, pp. 1-10.

International Search Report (PCT/ISA/210) issued in PCT/JP2021/038332, dated Feb. 1, 2022.

Kar et al., "Sensor Networks with Random Links: Topology Design for Distributed Consensus", IEEE Transactions on Signal Processing, vol. 56, No. 7, Jul. 2008, pp. 1-30.

Pereira et al., "Consensus in Correlated Random Wireless Sensor Networks", IEEE Trans. Signal Process., vol. 59, No. 12, Dec. 2011, pp. 6279-6284.

Ren et al., "A Survey of Consensus Problems in Multi-agent Coordination", Proceedings of the 2005, American Control Conference, Portland, OR, USA, Jun. 8-10, 2005, pp. 1859-1864.

Vanka et. al., "Convergence Speed of the Consensus Algorithm with Interference and Sparse Long-Range Connectivity", arxiv. org, Cornell University Library, Nov. 24, 2010, pp. 1-27.

Written Opinion of the International Searching Authority (PCT/ISA/237) issued PCT/JP2021/038332, dated Feb. 1, 2022.

\* cited by examiner

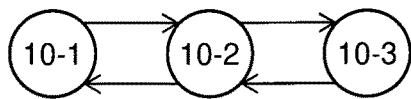
Fig. 1
a)    $L_3(k) = \begin{bmatrix} 0 & 0 & 0 \\ -1 & 2 & -1 \\ -1 & 0 & 1 \end{bmatrix}$
b)    $L_3(k) = \begin{bmatrix} 1 & -1 & 0 \\ 0 & 0 & 0 \\ 0 & -1 & 1 \end{bmatrix}$
c)    $\bar{L}_3(k) = \begin{bmatrix} p_{12} & -p_{12} & 0 \\ -p_{21} & p_{21}+p_{23} & -p_{23} \\ 0 & -p_{32} & p_{32} \end{bmatrix}$
Fig. 2
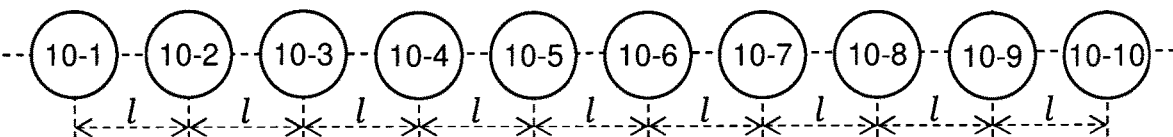
Fig. 3 a)

b)

c)

METHOD, DEVICE AND SYSTEM FOR CONFIGURING COMMUNICATION LINK USED FOR EXCHANGING DATA RELATED TO COOPERATIVE CONTROL ALGORITHM

TECHNICAL FIELD

The present disclosure relates to communication systems and relates more specifically to the cooperative control of multiple communicating nodes, a.k.a. multi-agent systems (MAS).

BACKGROUND ART

Cooperative control algorithms aim at enabling multiple communicating nodes to fulfill a common goal.

For instance, the consensus algorithm aims at enabling multiple communicating nodes to achieve an agreement on a local control information. In practice, a number of communicating nodes exchange data with their neighbors to agree on a same local control information that enable them to work together in a coordinated fashion. When multiple communicating nodes agree on the value of the local control information, they are said to have reached a consensus.

Cooperative control algorithms such as the consensus algorithm or the model predictive control (MPC) algorithm are often applied in formation control problems with applications to mobile robots, unmanned air vehicles (UAVs), autonomous underwater vehicles (AUVs), satellites, aircraft, spacecraft, automated highway systems, etc. Cooperative control algorithms can also be applied to non-formation related problems such as task assignment, payload transport, role assignment, air traffic control, synchronization, etc.

A typical application of a cooperative control algorithm such as a consensus algorithm can be to measure the average temperature in a geographical area from a set of remote sensors, or to control a platoon of vehicles on a highway in order to e.g. maintain the geometrical arrangement of the vehicles of the platoon substantially constant over time.

Owing to their principle, cooperative control algorithms require the communicating nodes to exchange data between them using communication links using any appropriate communication protocol. For instance, in the case of communicating nodes embedded in vehicles of a platoon of vehicles, the communication protocols may be for instance ITS-G5, IEEE WAVE or 3GPP Cellular-V2X standards, etc.

Communication links, and in particular wireless communication links are prone to data packet losses that can significantly degrade the control performance of the cooperative control algorithm as compared to an ideal situation with no packet losses. At the same time, the cooperative control algorithm shall be able to react to unexpected perturbations at a speed significantly higher than the system's rate of change. For instance, in the case of a cooperative control algorithm applied by a platoon of vehicles on a highway in order to maintain said vehicles in a predetermined geometrical arrangement, it is can be easily understood that the cooperative control algorithm must react quickly to unexpected perturbations (e.g. due to wind).

Hence, data packet losses need to be taken into account in order to guarantee that the cooperative control algorithm converges at a speed compliant with the cooperative control requirements.

In conventional systems, the control layer (which manages the cooperative control algorithm) and the communication layer (which manages the communication links) are managed separately. The communication parameters of the communication links may be optimized in order to maximize the performance over the communication links, in an attempt to reduce data packet losses. In turn, the control parameters of the cooperative control algorithm are optimized in order to maximize the convergence speed (a.k.a. convergence rate) of the cooperative control algorithm.

However, such an approach may lead to a situation in which both the communication performance over the communication links and the control performance of the cooperative control algorithm are unnecessarily over-dimensioned, which might further lead to coexistence issues when e.g. a plurality of platoons of vehicles are co-located in a same geographical area.

Citation List

Non Patent Literature

NPL 1

S. Kar and J. M. F. Moura, "Sensor Networks with Random Links: Topology Design for Distributed Consensus", in IEEE Transactions on Signal Processing, vol. 56, no. 7, pp. 3315-3326, July 2008.

NPL 2

S. Silva Pereira and A. Pages-Zamora, "Consensus in Correlated Random Wireless Sensor Networks", IEEE Trans. Signal Process., vol. 59, n° 12, p. 6279-6284, 2011, doi: 10.1109/TSP.2011.2166552.

NPL 3

Wei Ren, R. W. Beard, and E. M. Atkins, "A survey of consensus problems in multi-agent coordination", in Proceedings of the 2005, American Control Conference, 2005, Portland, OR, USA, 2005, p. 1859-1864, doi: 10.1109/ACC.2005.1470239.

SUMMARY OF INVENTION

The present disclosure aims at improving the situation. In particular, the present disclosure aims at overcoming at least some of the limitations of the prior art discussed above, by proposing a solution for reducing the interference generated by exchanging, between the communicating nodes, data of the cooperative control algorithm while still ensuring that the cooperative control requirements are satisfied.

For this purpose, and according to a first aspect, the present disclosure relates to a method for configuring communication links between a plurality of communicating nodes, wherein the communication links are used for exchanging data related to a cooperative control algorithm, wherein the cooperative control algorithm comprises at least one control parameter, wherein the communicating nodes are arranged according to a regular formation, said method comprising:

- selecting, by a reference device, a candidate neighbor node communication pattern for the regular formation and a candidate value of at least one communication parameter;
- determining, by the reference device, a candidate communication performance profile based on the candidate neighbor node communication pattern and on the candidate value of the at least one communication parameter;

estimating, by the reference device, a control performance level of the cooperative control algorithm based on the at least one control parameter and on the candidate communication performance profile;

estimating, by the reference device, an interference level generated by the communicating nodes when using the candidate neighbor node communication pattern and the candidate value of the at least one communication parameter;

wherein different control performance levels and different interference levels are estimated for different candidate neighbor node communication patterns and different candidate values of the at least one communication parameter until a predetermined control performance criterion and a predetermined interference criterion are both satisfied, thereby identifying a reference set having a reference neighbor node communication pattern, a reference value of the at least one communication parameter and a reference communication performance profile;

wherein all or part of the reference set is used for configuring communication links between communicating nodes.

Hence, the method relates to the case where the communicating nodes which apply the cooperative control algorithm are arranged according to a regular formation. A regular formation corresponds to a geometrical arrangement in which the distances between a communicating node and its adjacent communicating nodes do not depend on the position of the communicating node in the geometrical arrangement. In other words, a regular formation corresponds to a geometrical arrangement which may be described as a finite convex set of lattice points in the Euclidian space $\mathbb{R}^n$, with n=1, 2 or 3.

It is emphasized that the communicating nodes may be arranged according to a regular formation only on average. For instance, the goal of the cooperative control algorithm may be to maintain the communicating nodes arranged according to a target regular formation, in which case the arrangement may vary slightly over time around said target regular formation, due e.g. to control errors, etc. Hence, "arranged according to a regular formation" means in the present disclosure that the formation may be assumed to be regular for the purpose of the configuring method. For instance, the formation may be strictly or approximately regular and fixed over time, or the positions of the communicating nodes may be controlled (possibly by the cooperative control algorithm) to achieve a predetermined target regular formation, etc.

For instance, the regular formation can correspond to a geometrical arrangement in which the communicating nodes are arranged according to 1D (n=1), 2D (n=2) or 3D (n=3) lattice points. With 1D lattice points, the communicating nodes are all aligned and the distance between adjacent communicating nodes is the same for any pair of adjacent communicating nodes. With 2D lattice points, the lattice may be rectangular, square, rhombic, parallelogrammical, hexagonal or equilateral triangular. With 3D lattice points, the lattice may be any one of the fourteen Bravais lattices.

Also, the method assumes that all communicating nodes will use the same neighbor node communication pattern for exchanging data related to the cooperative control algorithm. A neighbor node communication pattern, which depends on the regular formation, corresponds to a definition of the neighbor communicating nodes with which a communicating node is to exchange data directly for the purpose of the cooperative control algorithm. For instance, a neighbor node communication pattern may consist in exchanging data directly only with adjacent communicating nodes, in which case all communicating nodes exchange data directly only with their adjacent communicating nodes. According to another example, a neighbor node communication pattern may consist in exchanging data directly with adjacent communicating nodes and with their adjacent communicating nodes. According to another example, a neighbor node communication pattern may consist in exchanging data directly with all the other communicating nodes, etc.

By assuming that all communicating nodes will use the same neighbor node communication pattern, the number of communication parameters to be optimized is reduced. Since the communicating nodes are arranged according to a regular formation, using the same communication parameters by all communicating nodes should also yield substantially the same communication performance profile on the communication links, if the propagation conditions are substantially the same between all communicating nodes. These features enable to reduce the number of communication parameters to be selected for the communicating devices and to reduce the complexity of the prediction of the communication performance profile on the communication links.

The method evaluates different candidate sets of parameters until a reference set is found that satisfies both a predetermined interference criterion and a predetermined control performance criterion.

Each candidate set comprises a candidate neighbor node communication pattern, which may be selected among a predetermined list of neighbor node communication patterns for the regular formation, a candidate value for at least one communication parameter (modulation, channel coding scheme, multi-antenna scheme, transmission power, etc.) and a candidate communication performance profile (determined based on the candidate neighbor node communication pattern and on the candidate value of the at least one communication parameter).

For each candidate set, a control performance level and an interference level are estimated and used to evaluate whether the interference criterion and the control performance criterion are satisfied.

Hence, the method optimizes the communication parameters and the neighbor node communication pattern to both:

meet the cooperative control requirements, e.g. by ensuring that the convergence speed of the cooperative control algorithm is faster than a predetermined minimum convergence speed;

reduce the interference generated by the communicating nodes for exchanging data related to the cooperative control algorithm.

All or part of the reference set is then used for configuring communication links between communicating nodes.

In specific embodiments, the method can further comprise one or more of the following features, considered either alone or in any technically possible combination.

In specific embodiments, the method further comprises configuring the at least one control parameter by estimating different control performance levels and different interference levels for different candidate values of the at least one control parameter, and the reference set further comprises a reference value of the at least one control parameter used for configuring the cooperative control algorithm.

In specific embodiments, the candidate communication performance profile is further estimated based on a propagation model and a communication performance model.

In specific embodiments, at least one communicating node performs a local adaptation of the value of the at least one communication parameter in order to achieve the reference communication performance profile on the communication links of said at least one communicating node.

In specific embodiments, the method comprises determining a first reference communication performance profile and a second reference communication performance profile for the reference set, the second reference communication performance profile having a higher communication performance, such that:

the control performance criterion is satisfied for both the first reference communication performance profile and the second reference communication performance profile; and the interference criterion is satisfied for at least the first reference communication performance profile.

In specific embodiments, the method comprises obtaining a target robustness factor, and at least one among the first reference communication performance profile and the second reference communication performance profile is determined based on said target robustness factor.

In specific embodiments, at least one communicating node performs a local adaptation of the value of the at least one communication parameter in order to achieve on the communication links of said at least one communicating node a communication performance profile bounded by the first reference communication performance profile and the second reference communication performance profile.

In specific embodiments, each communication performance profile is a packet delivery ratio, PDR, profile.

In specific embodiments, the method comprises obtaining, by the reference device, a target convergence speed for the cooperative control algorithm, and:

the estimated control performance level is an estimated convergence speed of the cooperative control algorithm;

the control performance criterion is satisfied when the estimated convergence speed is faster or equal to the target convergence speed.

In specific embodiments, the interference criterion is satisfied when the estimated interference level is minimized or below a predetermined threshold.

In specific embodiments, the regular formation corresponds to an arrangement in which the communicating nodes are arranged according to 1D or 2D or 3D lattice points.

In specific embodiments, the cooperative control algorithm is a consensus algorithm.

In specific embodiments, the reference device is one of the communicating nodes.

According to a second aspect, the present disclosure relates to a computer program product comprising instructions which, when executed by at least one processor, configure said at least one processor to carry out a method according to any one of the embodiments of the present disclosure.

According to a third aspect, the present disclosure relates to a computer-readable storage medium comprising instructions which, when executed by at least one processor, configure said at least one processor to carry out a method according to any one of the embodiments of the present disclosure.

According to a fourth aspect, the present disclosure relates to a device comprising a wireless communication unit and a processing circuit configured to carry out a method according to any one of the embodiments of the present disclosure.

According to a fifth aspect, the present disclosure relates to a communication system comprising a plurality of communicating nodes and at least one reference device according to any one of the embodiments of the present disclosure, said reference device being one of the communicating nodes or separate from said communicating nodes.

In specific embodiments, the communicating nodes are embedded in respective vehicles of a vehicle platoon.

The invention will be better understood upon reading the following description, given as an example that is in no way limiting, and made in reference to the figures.

BRIEF DESCRIPTION OF DRAWINGS

FIG. 1 is a schematic representation of a graph representing the communication links between communicating nodes.

FIG. 2 is a schematic representation illustrating the impact of packet losses on a graph and on its Laplacian matrices.

FIG. 3 is a schematic representation of communicating nodes arranged according to 1D lattice points.

DESCRIPTION OF EMBODIMENTS

Figures 4, 5:
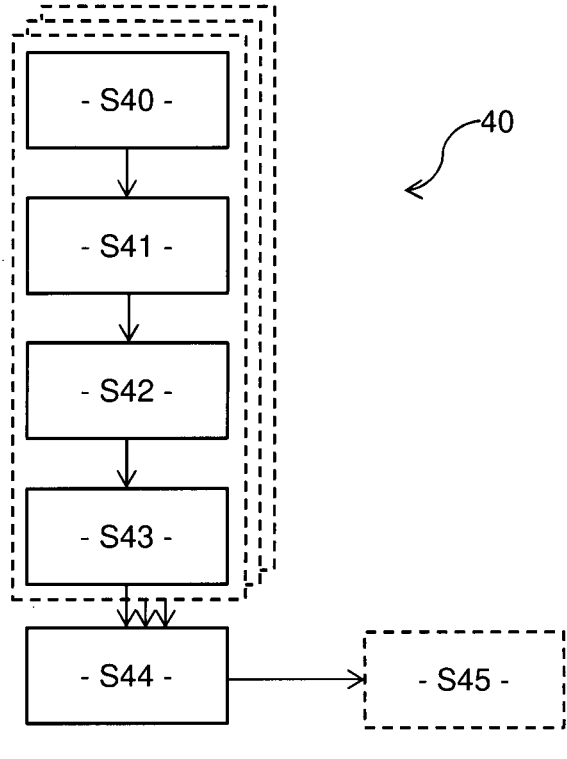
FIG. 4 is a diagram representing the main steps of an exemplary embodiment of a method for configuring communication links.
FIG. 5 are schematic representations of different neighbor node communication patterns possible for the regular formation represented by FIG. 3.

In these figures, references identical from one figure to another designate identical or analogous elements. For reasons of clarity, the elements shown are not to scale, unless explicitly stated otherwise.

As indicated above, the present disclosure relates to the cooperative control of a plurality of communicating nodes.

We first present conventions used in the following description, and how the performance of a cooperative control algorithm may be evaluated, for the non-limiting case of the consensus algorithm.

Graph Theory [NPL 3]

It is natural to model data exchange between communicating nodes by directed/undirected graphs. A digraph (i.e. a directed graph) consists of a pair ($\aleph$, $\varepsilon$), where $\aleph$ is a finite nonempty set of communicating nodes and $\varepsilon \in \aleph^2$ is a set of ordered pairs of communicating nodes, called directed edges ($\epsilon_{ij}$ is the directed edge or communication link from the communicating node j to the communicating node i). For simplification purposes, we use in the following "edge" rather than "directed edge" and "graph" rather than "digraph" (the context, i.e. directed or undirected is considered clear).

As a comparison, the pairs of communicating nodes in an undirected graph are unordered. A directed path is a sequence of ordered edges in a digraph, of the form $\epsilon_{ij}$, $\epsilon_{ki}$, $\epsilon_{lk}$, . . . , where i, j, k, l, . . . $\in \aleph$, in a digraph. An undirected path in an undirected graph is defined analogously, where $\epsilon_{ij}$ implies $\epsilon_{ji}$. A digraph is called "strongly connected" if there is a directed path from every communicating node to every other communicating node. An undirected graph is called connected if there is a path between any distinct pair of communicating nodes. A directed tree is a digraph in which every communicating node, except the root, has exactly one parent. A spanning tree of a digraph is a directed tree formed by graph edges that connect all the communicating nodes of the graph. We say that a graph has (or contains) a spanning tree if there exists a spanning tree that is a subset of the graph. Note that the condition that a digraph has a spanning tree is equivalent to the case that there exists a communicating node having a directed path to all other communicating nodes.

The adjacency matrix $A_n=[a_{ij}]_{0\leq i,j\leq n-1}$ of a deterministic digraph is defined as $a_{ii}=0$ and $a_{ij}=1$ if $\epsilon_{ij}\in\varepsilon$ where i·j. Setting $a_{ij}=0$ denotes the fact that a communicating node i does not (i.e. cannot or does not wish to) receive information from a communicating node j. The Laplacian matrix of the digraph is defined as $L_n=[l_{ij}]_{0\leq i,j\leq n-1}$ where $l_{ij}=-a_{ij}$ and $l_{ii}=\Sigma_j a_{ij}$, i.e.:

$$L_n=D_n-A_n$$

where $$D_n = \operatorname*{diag}_{0\leq i\leq n-1} l_{ii}$$

is the in-degree matrix (number of communicating nodes from which the communicating node i receives information). For an undirected graph, the Laplacian matrix is symmetric positive semi-definite.

FIG. 1 represents an undirected graph with n=3 communicating nodes 10. In this figure, the communicating nodes are referred to as 10–k with 1≤k≤n=3 in order to differentiate the communicating nodes 10. The associated adjacency and Laplacian matrices are the following:

$$A_3 = \begin{bmatrix} 0 & 1 & 0 \\ 1 & 0 & 1 \\ 0 & 1 & 0 \end{bmatrix}$$

$$L_3 = \begin{bmatrix} 1 & -1 & 0 \\ -1 & 2 & -1 \\ 0 & -1 & 1 \end{bmatrix}$$

Consensus Algorithms

Let $x_i(t)\in \mathbb{R}^m$ be the local control information of the $i^{th}$ communicating node. The local control information represents the information that needs be coordinated between communicating nodes, by using e.g. a consensus algorithm. The local control information may be for instance the communicating node's position, velocity, oscillation phase, decision variable, etc.

A continuous-time consensus algorithm can be summarized as:

$$\dot{x}_i(t) = -\sum_{j\in\Theta_i(t)} \alpha_{ij}(t)(x_i(t) - x_j(t))$$

wherein $\Theta_i(t)$ represents the set of communicating nodes whose local control information is available to the communicating node i at time t (defined by the adjacency matrix) and $\alpha_{ij}(t)$ denotes a positive possibly time-varying weighting coefficient. In other words, the local control information of each communicating node is driven toward the states of the local control information of its (possibly time-varying) neighbors at each time. It is common to extend the adjacency matrix for a weighted digraph $$A_n^w = \left[ a_{ij}^w \right]_{0\leq i,j\leq n-1}$$

defined as $$a_{ij}^w = \alpha_{ij}$$

if (j, i)$\in\varepsilon$ where i≠j and $$a_{ij}^w = 0$$

otherwise.

The continuous-time consensus algorithm can be written in matrix form:

$$\dot{x}(t) = -[L_n^w(t) \otimes I_m]x(t)$$

wherein $x=[x_0(t), x_1(t), \ldots, x_{n-1}(t)]^t$ is the information state vector comprising the local control information of all the communicating nodes, $$L_n^w = D_n^w - A_n^w,$$

$I_m$ is the identity matrix with size m, $\otimes$ the Kronecker matrix product.

In the following description, we consider in a non-limitative manner the discrete version of the consensus algorithm. It is assumed that the communicating nodes update the states of their local control information recurrently in time and transmit in the same time interval the updated values over the communication links. Each communicating node updates the state of its local control information according to:

$$x_i(k) = x_i(k-1) - \sum_{j\in\Theta_i(k)} \alpha_{ij}(k)(x_i(k-1) - x_j(k-1))$$

For the overall information state vector, we have:

$$x(k+1) = [W_n^w(k) \otimes I_m]x(k)$$

wherein:

$$W_n^w(k) = I_n - L_n^w(k), \; L_n^w(k) = D_n^w(k) - A_n^w(k)$$

wherein $$D_n^w(k) \text{ and } L_n^w(k)$$

are the in-degree and Laplacian matrices corresponding to a weighted digraph. The adjacency matrix is built e.g. by looking for each packet that was to be transmitted over the time interval if the packet was correctly received or not. The matrix $W_n(k)$ must be a stochastic matrix, wherein stochastic matrix means a matrix with rows that sum up to one with non-negative elements.

Note that the consensus algorithm may also be applied with a single weighting coefficient $\alpha$ for all the communicating nodes:

$$x_i(k) = x_i(k-1) - \alpha \sum_{j \in \Theta_i(k)} (x_i(k-1) - x_j(k-1))$$

In this case:

$$W_n(k) = I_n - \alpha L_n(k), \; L_n(k) = D_n(k) - A_n(k)$$

wherein $A_n(k)$ and $D_n(k)$ are the adjacency and in-degree matrices for a non-weighted digraph ($a_{ij}=0$ or $a_{ij}=1$). In the case of a deterministic graph, it can be shown that the weighting coefficient $\alpha$ must be such as $\alpha \leq 1/\deg_{max}$ where $\deg_{max}$ is the maximum degree of the graph, i.e. the maximum number of neighbors a communicating node can communicate with.

To illustrate the behavior of the consensus algorithm, let's first assume that each communicating node receives a scalar information from all the other communicating nodes at all times. Thus, we have $$x(k+1) = I_n x(k) - [I_n - J_n] x(k) = J_n x(k) = J_n^{k+1} x(0)$$

wherein $$J_n = \frac{1}{n} 1_n 1_n^t,$$

and $$1_n = [1]_{0 \leq i \leq n-1}^t$$

the all-one vector. Finally, as matrix $J_n$ is idempotent $$(J_n^{\kappa+1} = J_n),$$

we obtain:

$$x(k+1) = J_n x(0) = 1_n \left( \frac{1}{n} 1_n^t x(0) \right) \triangleq 1_n x_{avg}(0)$$

The local control information of all the communicating nodes converges to the same value that is the average of the initial information state vector. The convergence of the consensus algorithm can actually be generalized to other matrices $W_n$. It actually suffices that $$\lim_{k \to \infty} W_n^k \to 1_n v^t,$$

where v is a column vector.

In the sequel, we focus mainly on time-varying adjacency matrices. It is thus relevant to first remind convergence results for time-invariant topologies.

It can be shown that for a directed graph, the discrete-time consensus algorithm achieves consensus asymptotically if and only if the matrix $W_n$ has a single unitary eigenvalue associated to the eigenvector $1_n$, i.e. $\lambda_2(W_n) < 1$ wherein $\lambda_2(W_n)$ corresponds to the second largest eigenvalue of the matrix $W_n$ (similarly $\lambda_2(L_n) > 0$ wherein $\lambda_2(L_n)$ corresponds to the second smallest eigenvalue of the so-called Laplacian matrix $L_n$). This results actually means that the digraph has a spanning tree (i.e. there is no two separate graphs in the topology). Then, the consensus algorithm converges towards:

$$x(k) \to (1_n v^t \otimes I_m) x(0)$$

wherein $v = [v_i]_{0 \leq i \leq n-1} \geq 0$ satisfies $$v^t W_n = v^t \text{ and } 1_n^t v = 1,$$

i.e. v is the left row eigenvector of $W_n$ associated with eigenvalue 1. This means that the local control information of the communicating nodes converges towards the same linear combination of the initial information state vector $x(0)$, not necessarily the mean value. As left and right eigenvalues of a square matrix are the same, every stochastic matrix has, at least, one row eigenvector associated to the eigenvalue 1. In order to obtain an average consensus, i.e., $$v = \frac{1}{n} 1_n$$

the matrix $W_n$ needs only to be doubly stochastic. It is actually known that the discrete-time consensus algorithm can achieve average consensus asymptotically if and only if the directed graph is strongly connected (there is a spanning tree for each communicating node) and degree-balanced (each communicating node has the same number of connections in both directions—the in-degree equals the out-degree). Indeed, under this assumption, there always exists a weighting coefficient that leads to convergence.

For an undirected graph, the discrete-time consensus algorithm can achieve consensus asymptotically if and only if the matrix $W_n$ has a single unitary eigenvalue associated to the eigenvector $1_n$. From the topology point of view, it means that the graph is connected. If an undirected graph has a spanning tree, then it is necessarily strongly connected and balanced ($W_n$ is symmetric and thus doubly stochastic). The consensus algorithm converges in average.

Impact of Packet Losses

The results given in the previous section assume a time-invariant topology. In the present case, it is assumed that the communicating nodes exchange packets containing data related to the consensus algorithm using wireless communication links. This means that due to propagation conditions, the transmission may suffer from packet losses. Hence, the adjacency matrix is no longer constant but varies in time randomly. Unlike in the deterministic case, each element of the so-called instantaneous adjacency matrix can either take the value one or zero according to some random processes. It is common to assume that the propagation channel is stationary such that the elements take the value one with a given probability $$a_{ij}(k) = \begin{cases} 1 & \text{if } \epsilon_{ij} \in \varepsilon \text{ with probability } p_{ij} \\ 0 & \text{if } \epsilon_{ij} \in \varepsilon \text{ with probability } 1 - p_{ij} \end{cases}$$

In a more general case, the elements can be correlated in time and/or space or the probabilities can be variable in time. It is common to define the so-called super-graph that corresponds to the communication links with non-zero probability. Note that, in such a case, we have $$\mathbb{E}_{[A_n(k)]=\overline{A}_n=[p_{ij}]_{0 \leq i,j \leq n-1}}$$

where the probabilities associated to a communication link not belonging to the super-graph are assumed to be zeros. The following expressions will be used in the sequel super-graph: among all the possible communication links in a given topology, the communication links on which transmissions can actually occur (it is assumed here that some communication links might be "disconnected" on purpose);

instantaneous adjacency matrix $A_n(k)$: actual adjacency matrix at a given time with 1 on successful links and 0 elsewhere;

mean adjacency matrix $\overline{A}_n$: averaged adjacency matrix with probabilities $p_{ij}(P_{ij}=0$ if link $\epsilon_{ij}$ is not in the super-graph).

Note that the impact of the propagation channel is sometimes described as a source of an additive noise on the local control information received from the neighbor communicating nodes. The propagation channel actually affects the transmitted signal in many different ways including attenuation, shadowing, fast-fading and receiver noise. However, nowadays systems rely on communication protocols with channel encoding such that the data packets are either correctly received or not (packet loss). In the sequel, we consider in a non-limitative manner that the transmitted local control information is assumed to be perfectly received or not received at all.

FIG. 2 illustrates the impact of packet losses between communicating nodes. More specifically, part a) of FIG. 2 represents a first iteration of a dynamic (random) graph and the associated instantaneous Laplacian matrix derived from the instantaneous adjacency matrix. Part b) of FIG. 2 represents a second iteration of the dynamic graph and the associated instantaneous Laplacian matrix derived from the instantaneous adjacency matrix. Part c) represents the corresponding mean (random) graph and the associated mean Laplacian matrix derived from the mean adjacency matrix.

Conditions for Convergence

Of course, the occurrence of packet losses may impact the convergence of the consensus algorithm. However, it can be shown that under some conditions on the adjacency matrix, the consensus algorithm can actually converge towards an equilibrium.

In order to get practical results, it is possible to rely in case of randomly switching topologies on the almost sure statistical convergence criterion [NPL 1]. A dynamical system reaches consensus almost surely if for any initial state $x_i(0)$ $$\mathbb{P}\left(\lim_{k \to \infty} |x_i(k) - x_j(k)| = 0\right) = 1, \, 0 \leq i, \, j \leq n - 1$$

This condition can also be expressed as:

$$\forall \, \epsilon > 0, \, \forall \, \delta > 0, \, \exists \, N_\delta \mathbb{P}\left(\sup_{k \geq N_\delta} |x_i(k) - x_j(k)| > \epsilon\right) < \delta \; 0 \leq i, \, j \leq n - 1$$

Starting from this almost sure convergence criterion, some results have been issued in the literature. In particular, it has been shown that in case the elements of the adjacency matrix of an undirected graph are Bernoulli processes (independently and identically distributed in time and space), the discrete consensus algorithm with a single weighting coefficient $\alpha$:

$$x(k + 1) = [(I_n - \alpha L_n(k)) \otimes I_m]x(k)$$

can converge almost surely if and only if $\lambda_2(\overline{L}_n) > 0$ where $\overline{L}_n = \mathbb{E}(L_n(k))$ is the mean Laplacian matrix. It means that there is at least one weighting coefficient $\alpha$ that leads to convergence. This is true in particular for:

$$\alpha = \frac{1}{2 \, deg_{max}}$$

wherein $deg_{max}$ is the maximum degree of the graph. Interestingly, it is shown that the almost sure convergence can be obtained as long as the mean graph is connected and the adjacency matrix is ergodic. A more general result has been demonstrated for a directed graph for a system of the form:

$$x(k + 1) = [W_n(k) \otimes I_m]x(k)$$

wherein $W_n(k)$ is a row-stochastic matrix. It is shown that if the process of stochastic matrices $W_n(k)$ is ergodic stationary, the linear system reaches consensus almost surely if and only if $\lambda_2(\overline{W}_n) > 0$ where $\overline{W}_n = \mathbb{E}(W_n(k))$. There is however a major difference with the deterministic case related to the equilibrium state. Indeed, the system converges to an unknown common random vector $\theta$ depending on the initial state value $x(0)$ and the sequence of weight matrices (unknown mean and variance). The system converges to a weighted average of the initial state $(1_n v^t \otimes I_m) x(0)$ with $$1_n^t v = 1$$

if and only if:

$$\mathbb{P}(W_n^t v = v) = 1$$

i.e. all the weight matrices have almost surely the same common left eigenvector corresponding to the unit eigenvalue (variance equal to zero). The average consensus is almost surely reached when all weight matrices have almost surely the same common left eigenvector $$v = \frac{1}{n} 1_n,$$

i.e. if all the matrices are doubly stochastic. Note that this condition is not necessarily easy to enforce in the case of directed graphs even with bidirectional links (in case of perfect transmissions, a graph with bidirectional links on all edges is by construction an undirected graph, but as soon as transmission errors can occur on the links, the graph becomes a directed graph). A solution would be to only keep the situations where packets have been well received in both directions (i.e. $W_n$ (k) is symmetric). However, it is emphasized that the average convergence is not strictly required in many situations where only a consensus is sufficient.

Convergence Speed

As shown in the previous section, under some mild statistical conditions on the mean Laplacian, the consensus algorithm is able to converge towards an equilibrium state even in case of randomly switching topologies. The impact of packet losses thus reduces to a lower speed of convergence. It is thus required to define a figure of merit for measuring the convergence speed of the consensus algorithm. In the case of symmetric undirected instantaneous graph Laplacians, the convergence speed is generally analyzed in terms of the mean square of the error signal with respect to the initial average value:

$$\eta(k) = x(k) - x_{avg} = x(k) - J_n x(0)$$

Without loss of generalities, the notations are given here in the case of a scalar state (m=1) in the case of a single weighting coefficient. We have: $n(k+1) = [W_n(k) - J_n] \eta(k) = W_n(k)(I_n - J_n)n(k) = [R_n - \alpha L_n(k)] \eta(k)$ wherein $R_n = I_n - J_n$. In the more general case of asymmetric directed instantaneous graph Laplacians, the equilibrium value is unknown. It is common to evaluate the convergence in terms of the mean square of the error signal with respect to the instantaneous average value:

$$\zeta(k) = x(k) - x_{avg}(k) = (I_n - J_n)x(k) = R_n x(k)$$

Thus, we have:

$$\zeta(k+1) = (I_n - J_n)x(k+1) = (I_n - J_n)W_n(k)x(k)$$

$$= (I_n - J_n)(W_n(k) - J_n)x(k) = (I_n - J_n)W_n(k)(I_n - J_n)x(k)$$

$$= (I_n - J_n)W_n(k)\zeta(k)$$

The equalities come from the fact that $(I_n - J_n)J_n = 0$ and $W_n(k)J_n = J_n$. In the case of symmetric case, we have $(I_n - J_n)W_n(k) = W_n(k)(I_n - J_n)$ and therefore same errors as defined for the symmetric case.

In the deterministic case, the convergence speed is usually defined using the per-step convergence factor:

$$\gamma_s = \sup_{\zeta(k) \neq 0, k \in \mathbb{N}} \frac{\|\zeta(k+1)\|^2}{\|\zeta(k)\|^2}$$

It is an upper bound of per-step square error variation, i.e. a lower bound of convergence speed.

The deterministic per-step convergence factor computes the ratio of the square error from one iteration to the other (the error has decreased by a factor of x %) and takes the largest value over time. Here, we take an upper bound over time (the step is actually smaller for all the iterations). The deterministic per-step convergence factor has been generalized to the stochastic context according to the formulation:

$$\gamma_s = \sup_{\zeta(k) \neq 0, k \in \mathbb{N}} \frac{E[\|\zeta(k+1)\|^2 \mid \zeta(k)]}{\|\zeta(k)\|^2}$$

It is an upper bound of the per-step conditional mean square error variation, i.e. a lower bound of mean square convergence speed.

It can be shown that the system converges in the mean square sense and thus almost surely if $\gamma_s < 1$. From this definition, for all the realizations of the random variable $\zeta(k)$, we compute the ratio of the variance of the error given that value at the next iteration with the norm of the realization, and we take the upper bound over all these random values. In the present case, using the Rayleigh quotient property, we have:

$$\mathbb{E}[\zeta^t(k+1)\zeta(k+1) \mid \zeta(k)] =$$

$$\zeta^t(k)\mathbb{E}[W_n^t(k)R_n W_n(k)]\zeta(k) \leq \rho(W_n^t(k)R_n W_n(k))\zeta^t(k)\zeta(k)$$

where $\rho(M) = \max(|\lambda_i(M)|)$ is the spectral radius of a square matrix M. Finally, we obtain the following upper-bound of the per-step convergence factor:

$$\gamma_s = \rho(\mathbb{E}[W_n^t(k)R_n W_n(k)])$$

To facilitate the derivations, we introduce the following notations $$\gamma_s = \rho(\Psi_s), \ \Psi_s = \mathbb{E}[W_n^t(k)R_n W_n(k)]$$

One of the reasons for using the per-step convergence factor is that the value of the matrix $\Psi_s$ appears to be analytically tractable in some situations.

As shown in [NPL 2], for spatially correlated and independently and identically distributed in time Laplacians, and undirected topologies, the matrix $\Psi_s$ is:

$$\Psi_s = (\bar{L}_n^2 + 2(\bar{L}_n - \tilde{L}_n) + \bar{C}_n)\alpha^2 - 2\alpha\bar{L}_n + R_n$$

$$\tilde{L}_n = \bar{D}_n - \bar{A}_n \odot \bar{A}_n,$$

15
-continued $$\dot{D}_n = \text{diag}[(\bar{A}_n \odot \bar{A}_n) \odot 1_n],$$

$$[\bar{C}_n]_{ii} = g_i^t \bar{C} g_i,$$

$$[\bar{C}_n]_{ij} = \sum_k e_{kj}^t \bar{C} e_{ki} - g_j^t \bar{C} e_{ji} - g_i^t \bar{C} e_{ij},$$

$$g_i = 1_n e_i,$$

$$e_{ij} = e_i \otimes e_j$$

wherein:

$C = [c_{st}]_{0 \le s, t \le (n-1)^2}$ is a matrix that describes the spatial correlations between the links $\epsilon_{ij}$ and $\epsilon_{qr}$ for the nodes i, j, q,r as:

$$c_{st} = \begin{cases} \mathbb{E}(a_{ij} a_{qr}) - p_{ij} p_{qr} & \text{if } s \ne t \\ 0 & \text{if } s = t \end{cases} \text{ for } \begin{cases} s = i + jn \\ t = q + rn \end{cases}$$

$e_i$ is the $i^{th}$ column of $I_n$ and $\odot$ denotes the Schur product (also known as the Hadamard product).

This result is obtained under the following assumptions:

$$W_n(k)1_n = 1_n, \ 1_n^t W_n(k) = 1_n, \ \bar{W}_n 1_n = 1_n, \ 1_n^t \bar{W}_n = 1_n, \ \bar{A}_n = \bar{A}_n^t$$

$W_n$ is symmetric ($P_{ij} = P_{ji}$) and irreducible.

A similar expression also exists for directed topologies [Pereira2011].

These expressions show that is thus possible to evaluate the per-step convergence factor $\gamma_s$ of the consensus algorithm as a function of the mean adjacency and an n×n correlation matrices computed from the full $n^2 \times n^2$ correlation matrix, $\bar{A}_n$ and $\bar{C}_n$, associated to the graph. It shall be pointed out that the elements of the mean adjacency matrix $\bar{A}_n$ are actually directly related to the performance of the communication system as it measures the probability that a packet was received or not. It is important to mention that the loss of packets is not only related to the propagation channel but may also originate from the transmission system itself e.g. due to dropping of packets due to congestion in IEEE802.11 based systems, etc. The impact of the propagation channel on the communication performance is generally evaluated by means of the packet error rate (PER) that measures the probability that a packet transmitted is not received. In preferred embodiments, the communication performance is evaluated as a packet delivery rate (PDR) that measures the probability that a packet due to be transmitted was correctly received, the main difference with e.g. the PER is that the PDR accounts for packets that were not transmitted at all and were dropped instead due to e.g. a congested communication link. In the following description, we will consider in a non-limitative manner that the mean adjacency matrix $\bar{A}_n$ is populated by PDRs.

The convergence speed of the consensus algorithm is shown to depend on the communication performance achieved between the communicating nodes, i.e. typically the PDRs associated to the communication links but also the correlation factors between these different communication links (given by the mean correlation matrix $\bar{C}_n$).

Method for Configuring Communication Links

As discussed above, the present disclosure relates to a method 40 for configuring wireless communication links between a plurality of communicating nodes 10. The communication links to be configured are used for exchanging data related to a cooperative control algorithm used by each communicating node to fulfill a common goal. For instance, the cooperative control algorithm may be a consensus algorithm, an MPC algorithm, etc. For e.g. a consensus algorithm, data is exchanged between the communicating nodes to update a local control information until all communicating nodes 10 have converged towards having the same local control information.

In the present disclosure, the communicating nodes 10 are assumed to be arranged according to a predetermined regular formation. A regular formation corresponds to a geometrical arrangement in which the distances between adjacent communicating nodes 10 do not depend on the position of the adjacent communicating nodes 10 in the geometrical arrangement.

In the following, we consider in a non-limitative manner that the regular formation corresponds to a finite convex set of 1D lattice points, i.e. a geometrical arrangement in which the communicating nodes 10 are all aligned and the distance between adjacent communicating nodes 10 is the same for any pair of adjacent communicating nodes 10. FIG. 3 represents schematically an example of such a regular formation with n=10 communicating nodes 10. In this figure, the communicating nodes are referred to as 10-k with 1≤k≤n in order to differentiate the communicating nodes 10. Adjacent communicating nodes 10 are all separated by a distance l that is the same for all pairs of adjacent communicating nodes 10. For instance, the communicating nodes 10 are embedded in respective vehicles of a vehicle platoon, and the cooperative control algorithm may be used e.g. to maintain the vehicles substantially aligned and separated by a predetermined distance. The communication links may use vehicle to vehicle (V2V) communication protocols such as those defined by the ITS-G5, IEEE WAVE or 3GPP Cellular-V2X standards.

The configuration of the communication links aims at selecting a neighbor node communication pattern and at least one communication parameter. In the following, we assume in a non-limitative manner that a plurality of communication parameters is selected. It is however emphasized that the present disclosure may also be used, in other embodiments, by selecting only one communication parameter.

The cooperative control algorithm comprises at least one control parameter. In the following, we assume in a non-limitative manner that the cooperative control algorithm is a consensus algorithm, and that a single control parameter is used, i.e. the weighting coefficient α. However, it is also possible to consider, in other examples, other cooperative control algorithms and/or more than one control parameters (e.g. the weighting coefficients $\alpha_{ij}$).

FIG. 4 represents schematically the main steps of a method 40 for configuring communication links.

As illustrated by FIG. 4, said method 40 comprises a step S40 of selecting, by a reference device 20, a candidate neighbor node communication pattern for the regular formation and candidate values of the communication parameters.

A neighbor node communication pattern corresponds to a definition of the neighbor communicating nodes 10 with which a communicating node 10 is to exchange data directly for the purpose of the consensus algorithm. The candidate neighbor node communication pattern is for instance selected among a plurality of predetermined neighbor node communication patterns. When applied by a communicating node 10, the candidate neighbor node communication pattern defines a sub-graph, i.e. a scheme that is repeated across the super-graph, at each communicating node 10.

FIG. 5 represents schematically examples of predetermined neighbor node communication patterns for the regular formation of FIG. 3. Part a) of FIG. 5 represents an example in which the neighbor node communication pattern consists in exchanging data directly only with neighbor nodes of rank 1, i.e. communicating nodes 10 which are at a distance l (i.e. adjacent nodes). Part b) of FIG. 5 represents an example in which the neighbor node communication pattern consists in exchanging data directly only with neighbor nodes of rank 1 and with neighbor nodes of rank 2, i.e. communicating nodes 10 which are at a distance l and communicating nodes 10 which are at a distance 2l. Part c) of FIG. 5 represents an example in which the neighbor node communication pattern consists in exchanging data directly only with neighbor nodes of ranks 1, 2 and 3, i.e. communicating nodes 10 which are at a distance l, 2l and 3l.

During step S40, the reference device 20 selects also candidate values for the considered communication parameters. For instance, the communication parameters comprise:

- a modulation to be used on the communication links: the selection may correspond to selecting a candidate value among a set of predetermined values such as {BPSK, QPSK, 16QAM, 64QAM};
- a coding rate to be used on the communication links: the selection may correspond to selecting a candidate value among a set of predetermined values such as {3/4, 2/3, 1/2, 1/3};
- a transmission power to be used on the communication links: the selection may correspond to selecting a candidate value among a set of predetermined values for the transmission power; etc.

In order to reduce the number of candidate values to be selected, the selection preferably assumes that the same candidate values of the communication parameters will be considered for each packet transmitted by each communicating node. Hence, if the candidate value for the modulation communication parameter corresponds to 16QAM, then the 16QAM modulation will be considered for all communication links of the neighbor node communication pattern, etc. This will be the case e.g. if each communicating node uses a broadcast or multicast communication scheme to exchange data with the other communicating nodes on the communication links of the neighbor node communication pattern. However, it is also possible to use e.g. point-to-point communication schemes (unicast), in which case each packet transmitted by a communicating node is assumed to use the same candidate values of the communication parameters regardless the recipient communicating node.

In the sequel, we consider in a non-limitative manner that the considered communication parameters, referred to as $P_{com}$, corresponds to a modulation and coding scheme, MCS, and to a transmission power $P_{Tx}$.

As illustrated by FIG. 4, the method 40 comprises also a step S41 of determining, by the reference device 20, a candidate communication performance profile based on the candidate neighbor node communication pattern and on the candidate values of the communication parameters $P_{com}$. The communication performance profile corresponds to the communication performance (e.g. PER, PDR, etc.) that is expected to be achieved for the candidate values of the communication parameters on the communication links of the candidate neighbor node communication pattern.

In preferred embodiments, the candidate communication performance profile may be estimated based on a predetermined propagation model and a predetermined communication performance model.

The propagation model corresponds to a model of the propagation channel experienced on the different communication links.

The communication performance model corresponds to a model of the communication performance (e.g. PER, PDR, etc.) that can be achieved with different values of the communication parameters and for different propagation conditions. For instance, the communication performance model may provide PDRs associated to different values of the communication parameters and different propagation conditions. For instance, for a given communication link of the candidate neighbor node communication pattern, the propagation model may provide an estimate of the expected noise and interference levels, of the expected shadowing, etc. By further considering the candidate value of the transmission power $P_{Tx}$ and the distance between the two communicating nodes 10 of the considered communication link, it is possible to estimate a signal to noise ratio (SNR) for the considered communication link. Then the communication performance model may provide the expected PDR associated to the candidate value of the MCS for the estimated SNR. This can be performed for each communication link of the candidate neighbor node communication pattern, thereby providing the candidate communication performance profile of the candidate neighbor node communication pattern. Since all the communicating nodes 10 apply the same communication parameters throughout a regular formation, it allows, even in the case of large system load (large packet-rate) to rely on a communication performance model which depends only on the distance between the transmitter communicating node and the receiver communicating node rather than on all the communicating node positions and on the same communication parameters. As we have a regular formation and the same neighbor node communication pattern for all communicating nodes, we have in addition the same distance set between transmitter communicating node and receiver communicating node for each communicating node and therefore the same communication performance profile for all communicating nodes.

Such a communication performance model may be described using an analytical expression or a set of numerical loo-up-tables LUT, etc.

Figure 6:
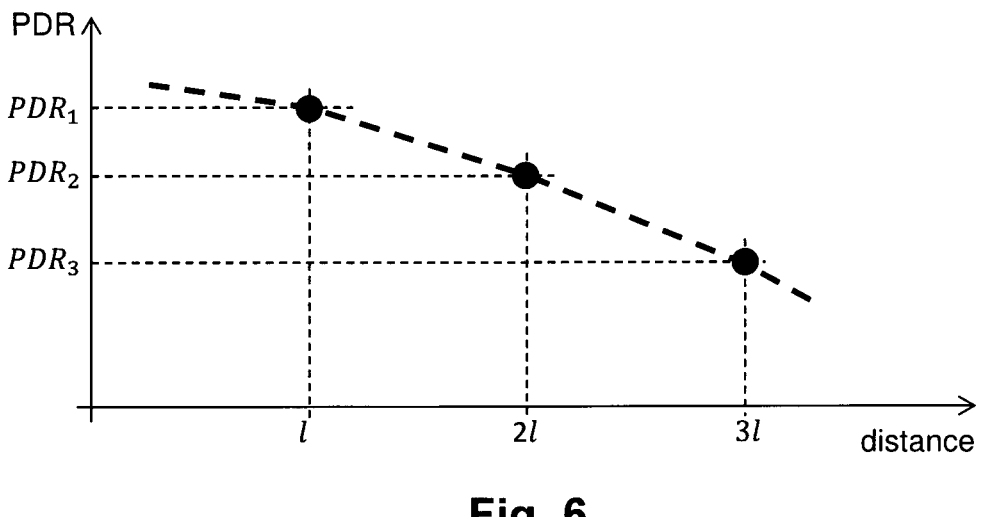
FIG. 6 is a plot representing an example of a communication performance profile.

FIG. 6 represents schematically an exemplary candidate communication performance PDR profile for the exemplary neighbor node communication pattern represented in part c) of FIG. 5. As illustrated by FIG. 6, the candidate communication performance profile comprises a first PDR value $PDR_1$ for the distance l (neighbor nodes of rank 1), a second PDR value $PDR_2$ for the distance 2l (neighbor nodes of rank 2) and a third PDR value $PDR_3$ for the distance 3l (neighbor nodes of rank 3).

As illustrated by FIG. 4, the method 40 comprises a step S42 of estimating, by the reference device 20, a control performance level of the cooperative control algorithm based on the control parameter and on the candidate communication performance profile.

For instance, in the case of the consensus algorithm, the control performance level may relate to the convergence speed of the consensus algorithm. The per-step convergence factor $\gamma_s$ is representative of the convergence speed (the smaller the per-step convergence factor $\gamma_s$ the higher the convergence speed). Hence, the control performance level may be in that case the upper bound $\gamma_s$. The candidate communication performance profile (e.g. PDRs) may be used to determine the mean Laplacian matrix $\overline{L}_n$ associated to the sub-graph, and possibly the mean correlation matrix $\overline{C}_n$, which may then be used with the value of the control parameter $\alpha$ to estimate the per-step convergence factor $\gamma_s$. Hence, in this example, estimating the control performance level may resume to computing the upper bound $\gamma_s(\alpha, P_{com}, C)$ for the control parameter $\alpha$, the candidate values of the communication parameters $P_{com}$ and the candidate neighbor node communication pattern C.

As illustrated by FIG. 4, the method 40 comprises a step S43 of estimating, by the reference device 20, an interference level generated by the communicating nodes 10 when using the candidate neighbor node communication pattern C and the candidate values of the communication parameters $P_{com}$. For instance, the interference level may also be estimated based on a predetermined amount of data to be transmitted for the purpose of the consensus algorithm. Any parameter representative of the level of interference generated may be considered. For instance, the interference level may be estimated as a duration of occupancy of the communication links, as a maximum transmission power required, or as an average transmission power, etc. In the following, we assume in a non-limitative manner that the interference level is represented by the average transmission power $\overline{P}_{Tx}$.

As illustrated by FIG. 4, the steps S40, S41, S42 and S43 may be repeated by considering different candidate values of the communication parameters and different candidate neighbor node communication patterns. Hence, different candidate sets are considered, comprising each candidate values of the communication parameters, a candidate neighbor node communication pattern and a candidate communication performance profile (determined based on the candidate values of the communication parameters and on the candidate neighbor node communication pattern). An interference level and a control performance level are estimated for each candidate set.

As illustrated by FIG. 4, the method 40 comprises a step S44 of determining a candidate set for which the estimated control performance level satisfies a predetermined control performance criterion and for which the estimated interference level satisfies a predetermined interference criterion. The candidate neighbor node communication pattern, the candidate values of the communication parameters and the candidate communication performance profile for which both the control performance criterion and the interference criterion are satisfied are referred to as respectively reference neighbor node communication pattern, reference values of the communication parameters and reference communication performance profile, and collectively referred to as reference set.

The method 40 may use any suitable control performance criterion, and the choice of a specific control performance criterion corresponds to a specific embodiment of the present disclosure. For instance, if the control performance level is representative of the convergence speed of the consensus algorithm, then the control performance level criterion may be satisfied when the estimated convergence speed is faster or equal to a target convergence speed. For instance, it is possible to define a target per-step convergence factor $\gamma_{target}$, and the control performance criterion may be considered satisfied if $\gamma_s(\alpha, P_{com}, C) \leq 65_{target}$.

The method 40 may use any suitable interference criterion, and the choice of a specific interference criterion corresponds to a specific embodiment of the present disclosure. For instance, the interference criterion is satisfied when the estimated interference level is minimized or below a predetermined threshold.

For instance, it is possible to identify a set $\mathcal{S}_{C,P_{com}}$ of candidate neighbor node communication patterns and candidate values of the communication parameters that satisfy the control performance criterion, i.e.:

$$\mathcal{S}_{C,P_{com}} = \{(C, P_{com}) | \gamma_s(\alpha(C), P_{com}, C) \leq \gamma_{target}\}$$

Then the reference neighbor node communication pattern $\hat{C}$ and the reference values $\hat{P}_{com}$ of the communication parameters may be selected in the set $\mathcal{S}_{C,P_{com}}$ by searching for a candidate neighbor node communication pattern and candidate values of the communication parameters for which the interference criterion is satisfied. For instance, if the interference criterion is satisfied when the average transmission power $\overline{P}_{Tx}$ is minimized:

$$(\hat{C}, \hat{P}_{com}) = \arg \min_{(C,P_{com}) \in \mathcal{S}_{C,P_{com}}} (\overline{P}_{Tx}(C, P_{com}))$$

Then all or part of the reference set may be used for configuring communicating links between communicating nodes 10.

As discussed above, the reference set is determined by a reference device 20. The reference device 20 may be one of the communicating nodes 10 or, alternately, may be separate from said communicating nodes 10 and capable of transmitting all or part of the reference set to all or part of the communicating nodes 10, directly and/or indirectly. It should be noted that there may be one or more reference devices 20. For instance, there may be only one reference device 20 which determines the reference set used for configuring the communication links of all communicating nodes 10. In some cases, there may be a plurality of reference devices 20 which determine independently the reference set, each reference device 20 configuring the communication links of a subset of the communicating nodes 10. In some cases, each communicating node 10 may be a reference device 20, and each communicating node 10 then determines its own reference set used for configuring its own communication links only.

In the example illustrated by FIG. 4, the reference device 20, which may be a communicating node 10, is assumed to configure the communication links of a plurality or all of the communicating nodes 10, and the method 40 then comprises a step S45 of distributing, by the reference device 20, all or part of the reference set to said communicating nodes 10. Then each communicating node 10 uses the information received for configuring the communication links.

For instance, the reference device 20 may transmit only the reference neighbor node communication pattern and the reference values of the communication parameters to the communicating nodes 10, and each communicating node 10 exchanges data with its neighbors on the communication links defined by the reference neighbor node communication pattern, and using the reference values of the communication parameters.

According to another example, the reference device 20 may transmit only the reference communication performance profile to the communicating nodes 10, which implicitly defines the reference neighbor node communication pattern. Then each communicating node 10 may e.g. locally adapt the values of the communication parameters in order to achieve the reference communication performance profile on the communication links of the reference neighbor node communication pattern. The control performance level depends mainly on the communication performance profile (e.g. PDRs). Since the actual propagation conditions experienced by a given communicating node 10 may differ from the expected propagation conditions retrieved from the propagation model and/or the relative positions of the communicating nodes can differ from the target regular formation (i.e. the formation may not be strictly regular), it is therefore advantageous to enforce the reference communication performance profile instead of enforcing the reference values of the communication parameters. Any method known to the skilled person may be used to perform the local adaptation in order to achieve the reference communication performance profile. If the communicating nodes 10 receive also from the reference device 20 the reference values of the communication parameters, then they can be used to initialize the values of the communication parameters in the local adaptation scheme.

For a given value of the control parameter, the convergence speed is achieved as long as the communicating nodes 10 enforce exactly the reference communication performance profile. However, it may occur that if the communicating nodes 10 achieve a better communication performance profile than the reference communication performance profile, the consensus algorithm may diverge. Also, if the communicating nodes 10 achieve a communication performance profile slightly worse than the reference communication performance profile, the consensus algorithm may converge but with a convergence speed slower than the target convergence speed.

Figure 7:
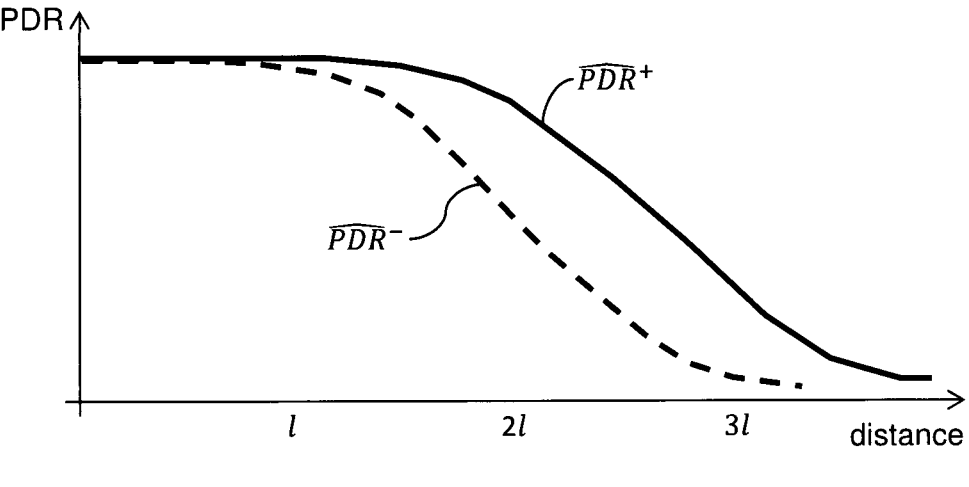
FIG. 7 is a plot representing an example of two communication performance profiles to be used for controlling the communication performance on the communication links.

Hence, in preferred embodiments, a first reference communication performance profile and a second reference communication performance profile are determined, wherein the second reference communication performance profile has a higher communication performance. Both the first and second reference communication performance profiles enable to satisfy the control performance . criterion (e.g. target convergence speed), and the interference criterion is satisfied for at least the first reference communication performance profile. Hence, the first reference communication performance profile corresponds to a lower bound while the second reference communication performance profile corresponds to an upper bound for the communication performance on the communication links of the neighbor communication pattern. FIG. 7 represents schematically an example of a first reference communication performance profile $\widehat{PDR}^-$ and of a second reference communication profile $\widehat{PDR}^+$. Hence, each communicating node 10 performs a local adaptation of the values of the communication parameters in order to achieve a communication performance profile that falls between the lower bound $\widehat{PDR}^-$ and the upper bound $\widehat{PDR}^+$. Such provisions are advantageous in that some fluctuations in the actual communication performance are authorized while still satisfying the control performance criterion. Further examples are provided hereinbelow.

Since all the communicating nodes 10 apply the same neighbor node communication pattern throughout a regular formation, the proposed method 40 has inter alia the following advantages:
- the level of generated interference is also the same throughout the formation;
- it is possible to rely on a simplified communication performance model;

- the number of parameters to optimize is not dependent on the number of communicating nodes 10, since all communicating nodes 10 apply the same parameters;
- the amount of information (all or part of the reference set) to be transmitted from the reference device 20 to the communicating nodes 10 is limited; this information can be transmitted for instance using a multi-hop broadcasting or multicast solution.

In the example represented by FIG. 4, the value of the control parameter $\alpha$ is not optimized. For instance, the value of the control parameter $\alpha$ may be set to a predetermined value (i.e. $\alpha(C)=\alpha_0 \forall C$), or it may be completely defined by the candidate neighbor node communication pattern. The value of the control parameter $\alpha$ may also be distributed to the communicating nodes 10, during step S45. However, the communicating nodes 10 may also use the reference neighbor node communication pattern to determine the value of the control parameter $\alpha$, if it defines completely the value of the control parameter.

According to a first example, the value of the control parameter $\alpha$ may be set to the following value:

$$\alpha(C) = \alpha_{SG-MD} = 1/2deg_{max}$$

wherein $deg_{max}$ is the maximum degree of the super-graph. Hence, this value is defined by the selected candidate neighbor node communication pattern. The main advantage of this solution is that it guarantees the convergence of the consensus algorithm at least for undirected graphs whatever the achieved communication performance profiles. By construction, this solution achieves the highest robustness but at the expense of a significant increase of the interference level (as the parameter is small, it requires large PDRs to work).

According to a second example, the value of the control parameter $\alpha$ may be set to the following value:

$$\alpha(C) = \alpha_{SG-All1} = 2/(\lambda_2 + \lambda_{max})$$

wherein $\lambda_2$ and $\lambda_{max}$ are respectively the second and maximum eigenvalues of the deterministic Laplacian matrix of the super-graph where the eigenvalues are ordered as follows $0=\lambda_1<\lambda_2\leq . . . \leq\lambda_{max}$. This value is also defined by the selected candidate neighbor node communication pattern. This approach is shown to achieve a very good robustness, i.e. maximum possible robustness, for a relatively small degradation of the interference level with respect to the optimal one.

However, these solutions may appear as not satisfactory in some situations where e.g. the system may require a higher convergence speed or because it is required to further reduce the interference level.

Figures 8, 9:
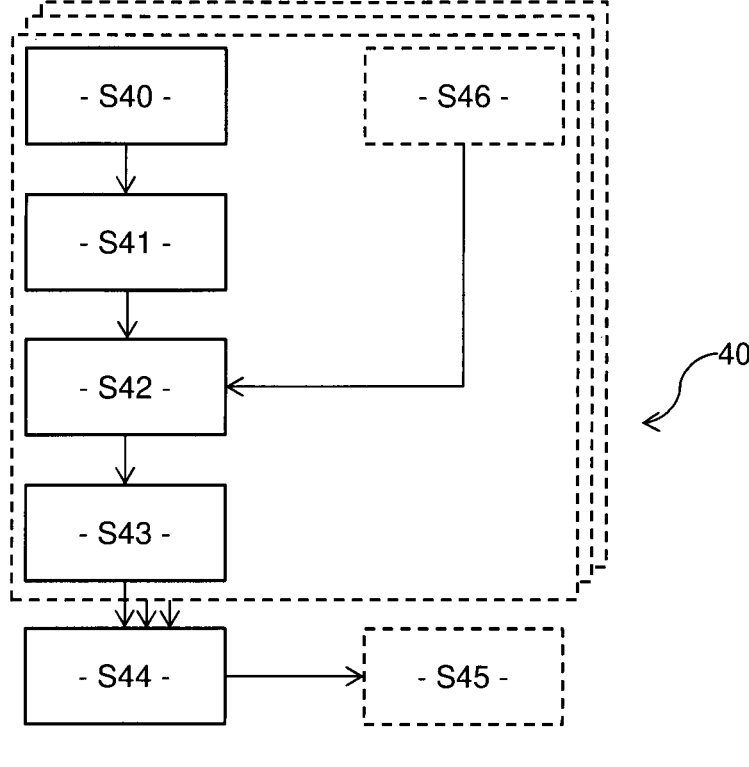
FIG. 8 is a diagram representing the main steps of a preferred embodiment of the method for configuring communication links.
FIG. 9 is a schematic representation of a reference device.

FIG. 8 represents the main steps of a preferred embodiment in which the method 40 further configures the control parameter $\alpha$. In addition to the steps discussed in reference to FIG. 4, the method 40 further comprises a step S46 of selecting a candidate value of the control parameter. The control performance level is estimated based on the selected candidate value of the control parameter $\alpha$. Different control performance levels and different interference levels are estimated for different candidate values of the control parameter $\alpha$, and the candidate set further comprises the selected candidate value of the control parameter. Hence, the value of the control parameter $\alpha$ is also optimized to ensure that both the control performance criterion and the interference criterion are satisfied. The value of the control parameter $\alpha$ may be used to provide an additional degree of freedom to further reduce the interference generated while ensuring that the convergence speed is faster than or equal to the target convergence speed.

For instance, it is possible to identify a set $\mathcal{S}_{\alpha,C,P_{com}}$ of candidate values of the control parameter, candidate neighbor node communication patterns and candidate values of the communication parameters that satisfy the control performance criterion, i.e.:

$$\mathcal{S}_{\alpha,C,P_{com}} = \{(\alpha, C, P_{com}) | \gamma_s(\gamma, P_{com}, C) \leq \gamma_{target}\}$$

Then the reference value $\hat{\alpha}$ of the control parameter, the reference neighbor node communication pattern $\hat{C}$ and the reference values $\hat{P}_{com}$ of the communication parameters may be selected in the set $\mathcal{S}_{\alpha,C,P_{com}}$ by searching for a candidate value of the control parameter, a candidate neighbor node communication pattern and candidate values of the communication parameters for which the interference criterion is satisfied. For instance, if the interference criterion is satisfied when the average transmission power $\overline{P}_{Tx}$ is minimized:

$$(\hat{\alpha}, \hat{C}, \hat{P}_{com}) = \arg\min_{(\alpha, C, P_{com}) \in \mathcal{S}_{\alpha, C, P_{com}}} (\overline{P}_{Tx}(\alpha, C, P_{com}))$$

During step S45, the reference value $\hat{\alpha}$ of the control parameter is distributed to the communicating nodes 10 and used by each communicating node 10 to locally configure the consensus algorithm.

DETAILED EXAMPLES

We provide below more detailed exemplary embodiments of the method 40 for configuring the communication links and the control parameter.

It is assumed that a number n of communicating nodes 10 are arranged in a regular formation in which all the communicating nodes 10 are aligned and the distance l between adjacent communicating nodes 10 is the same for any pair of adjacent communicating nodes 10 (1D lattice points).

These communicating nodes 10 are assumed to apply a consensus algorithm using communication links for exchanging data. We consider in a non-limitative manner that the communication performance profile is entirely defined by the finite set of PDRs associated to the achievable distances in the regular formation (if any, correlations are ignored, i.e. $\overline{C}_n=0$). It is also assumed that a communication performance model $f_{PDR}$ for the PDR is available for the regular formation. For a communication link between a pair of communicating nodes 10 separated by a distance $\underline{d}$, the communication performance is typically defined as the following function:

$$f_{PDR}(\underline{d}, P_{Tx}, MCS;, N_p, P_{AWGN}, \underline{\beta}_c, \rho_p, \rho_v)$$

wherein $P_{Tx}$ is the candidate value of the transmission power, MCS is the candidate value for the MCS, $N_p$ is the packet size of the data packets to be exchanged (e.g. number of bytes), $P_{AWGN}$ is the noise level (provided by e.g. the propagation model, may also include external interference), $\underline{\beta}_c$ corresponds to the propagation parameters (path gain, shadowing, etc., provided by e.g. the propagation model), $\rho_p$ is packet rate in time (packet time density) and $\rho_v$ is the communicating node rate in space (node spatial density). $\rho_p$ and $\rho_v$ are considered in this example to account for the occupancy of the propagation channel, which might prevent a communicating node 10 from transmitting a packet, thereby impacting the PDR.

The candidate neighbor node communication pattern (or sub-graph) is selected among predefined neighbor node communication patterns, which differ by the maximum rank r of the neighbor nodes with which a communicating node 10 exchanges data directly. Hence, with r=1, the communicating node 10 exchanges data directly only with neighbor nodes of rank 1, i.e. communicating nodes 10 which are at a distance 1 (i.e. adjacent nodes). With r=2, the communicating node 10 exchanges data directly only with neighbor nodes of rank 1 and with neighbor nodes of rank 2, i.e. communicating nodes 10 which are at a distance 1 and communicating nodes 10 which are at a distance 21. With r=3, the communicating node 10 exchanges data directly only with neighbor nodes of ranks 1, 2 and 3, i.e. communicating nodes 10 which are at a distance l, 2l and 3l, etc. In other words, for a candidate neighbor node communication pattern C of index r, each communicating node 10 exchanges data with up to r neighbor nodes on each side, with at most 2×r neighbor nodes. Of course the communicating nodes 10 located towards the beginning and towards the end of the regular formation may not have r neighbor nodes on each side, and the actual number of neighbor nodes is between r and 2×r, depending on the position of the considered communicating node 10 in the regular formation.

In order to account for the selected candidate neighbor node communication pattern C (which is defined in the sequel as a scalar value C=2×r), a communication performance model $f_{RX-PDR}$ is defined as:

$$f_{RX-PDR}(\underline{d}) = 1_{\underline{d} \leq C/\rho_v/2} \times f_{PDR}(\underline{d}, P_{Tx}, MCS; N_p, P_{AWGN}, \underline{\beta}_c, \rho_p, \rho_v)$$

wherein $1_E$ is the indicator (or characteristics) function, i.e. $1_{\underline{d} \leq C/\rho_v/2}$ is equal to 1 if $\underline{d} \leq C\rho_v/2$ (i.e. $\underline{d} \leq r/\rho_v$) and equal to 0 otherwise. In other words, the PDR is null if the considered communication link (defined by $\underline{d}$) is not in the selected candidate neighbor node communication pattern C, and equal to $f_{PDR}$ otherwise.

The communication performance model can be indifferently described using an analytical expression or as a set of numerical LUTs. In order to reduce the amount of data to be stored, the communication performance model may be simplified as follows. First, the distances may be normalized according to the mean distance between communicating nodes 10, i.e. $d=\underline{d} \times \rho_v$, and some of the propagation parameters in $\underline{\beta}_c$ can be normalized by $1/\rho_v$, yielding $$\beta_c : \overline{f}_{RX-PDR}(d, C, d_{cov}, MCS) =$$
$$1_{d \leq C/2} \times \overline{f}_{PDR}(d, P_{Tx}, MCS; N_p, P_{AWGN}, \beta_c, \rho_p, \rho_v)$$

Second, the transmission power and the node spatial density $\rho_v$ may be replaced by only one parameter $$d_{cov} : \overline{\overline{f}}_{RX-PDR}(d, C, d_{cov}, MCS) =$$
$$1_{d \leq C/2} \times \overline{\overline{f}}_{PDR}(d, d_{cov}, MCS; N_p, P_{AWGN}, \beta_c, \rho_p)$$

wherein $d_{cov}$ is defined as the normalized coverage distance without self-interference nor shadowing (e.g. considering only mean path gain and AWGN) for which we have a predetermined target PER, for instance equal to 10%. In other words, $d_{cov}$ corresponds to the normalized coverage distance for which the target PER is theoretically obtained without any packet collision (pure AWGN case without shadowing).

The target PER leads to a target SNR $SNR_{req}$ using a predetermined packet error rate function $f_{PER}$ (SNR; MCS, $N_p$) giving the packet error rate for the AWGN channel (LUT, complementary error function-based model, log-linear model with saturation function, etc.). Hence, given the target PER, the candidate MCS and $NN_p$, the packet error rate function $f_{PER}$ enables to determine the target SNR $SNR_{req}$. Then the relationship between the distance and the PER is obtained from the path gain model PG(d):

$$SNR = \frac{P_{Tx} \times PG(d)}{P_{AWGN}}$$

For instance, it is possible to use e.g. a one-slope path gain model:

$$PG(d) = G \times d^{\alpha_c} \times \chi$$

wherein:

G is the channel and antenna gain at $1/\rho_v$;

$\alpha_c$ is the path loss exponent;

$\chi$ a log-normally distributed shadowing coefficient with standard deviation $\sigma_c$.

Finally, the normalized coverage distance $d_{cov}$ may defined as e.g.:

$$d_{cov}(P_{Tx}, SNR_{Req}; G, \alpha_c, P_{AWGN}) = \left( \frac{P_{Tx} \times G}{SNR_{Req} \times P_{AWGN}} \right)^{\frac{1}{\alpha_c}}$$

The advantage of using $d_{cov}$ is to provide a direct relationship between the transmission power and a distance-related variable.

As discussed above, we consider here the case where the control parameter $\alpha$, the communication parameters $P_{com}$ and the neighbor node communication pattern C are to be configured. For instance, it is possible to first identify the set $S_{\alpha,C,P_{com}}$ that satisfies the control performance criterion:

$$S_{\alpha,C,P_{com}} = \{(\alpha, C, P_{com}) | \gamma_s(\alpha, P_{com}, C) \le \gamma_{target}\}$$

and then determine $(\hat{\alpha}, \hat{C}, \hat{P}_{com})$ satisfying the interference criterion. For instance, if the interference criterion is satisfied when the average transmission power $\overline{P}_{Tx}$ is minimized, and assuming that $\overline{P}_{Tx} = P_{Tx}(\alpha, C, P_{com}) \times \rho_{occ}(MCS)$ (wherein $0 < \rho_{occ}(MCS) \le 1$ is the propagation channel occupancy ratio):

$$(\hat{\alpha}, \hat{C}, \hat{P}_{com}) = \arg \min_{(\alpha,C,P_{com}) \in S_{\alpha,C,P_{com}}} (P_{Tx}(\alpha, C, P_{com}) \times \rho_{occ}(MCS))$$

In order to avoid optimizing on the transmission power $P_{Tx}$, the latter expression may be expressed as:

$$(\alpha, \hat{C}, \hat{P}_{com}) = \arg \min_{(\alpha,C,P_{com}) \in S_{\alpha,C,P_{com}}} (SNR_{Req}(MCS) \times d_{cov}^{\alpha_c} \times \rho_{occ}(MCS))$$

Hence, the communication parameters $P_{com}$ may be considered to be the normalized coverage distance $d_{cov}$ and the MCS.

Inserting the communication performance model in the expression of the per-step convergence factor upper bound $\gamma_s$ leads to a highly non-linear model that may be computationally expensive to use. Preferably, it is possible to perform a sub-optimal but simpler optimization where the different parameters are optimized successively. However, other optimization strategies may be considered, and the choice of a specific optimization strategy corresponds to a specific embodiment of the present disclosure.

In a first phase, for each possible neighbor node communication pattern and for all the range of admissible $d_{cov}$ (the transmission power is necessarily limited), we look for the $\widehat{MCS}$ that maximizes the PDR for the longest distance in the neighbor node communication pattern:

$$\widehat{MCS}(d_{cov}, C) = \arg \max_{MCS} \overline{\tilde{f}}_{PDR}(d_{max}(C), d_{cov}, MCS; N_p, P_{AWGN}, \beta_c, \rho_p)$$

wherein $d_{max}(C) = r$ is the maximum normalized distance for the neighbor node communication pattern C. Then we can replace the MCS in the communication performance model, which now depends only on the normalized coverage distance $d_{cov}$ and the neighbor node communication pattern C. The corresponding communication performance model $\tilde{f}_{RX-PDR}$ is given by e.g.:

$$\tilde{f}_{RX-PDR}(d, C, d_{cov}) = \tilde{f}_{RX-PDR}(d, C, d_{cov}, \widehat{MCS})$$

In a second phase, for each candidate neighbor node communication pattern C and all admissible $d_{cov}$, we may look for the control parameter $\hat{\alpha}$ that minimizes the upper bound $\gamma_s$:

$$\hat{\alpha}(C, d_{cov}) = \arg \min_{\alpha} \gamma_s(\alpha_t CPP(C, d_{cov}))$$

wherein:

$$CPP(C, d_{cov}) \triangleq (CPP_i(C, d_{cov}))_{i \in [1,r]};$$

$$CPP_i(C, d_{cov}) = \tilde{f}_{RX-PDR}(d_i, C, d_{cov}), \forall i = 1 \ldots r;$$

$(d_i)_{i \in [1,r]}$ is the sequence of distances for the neighbor node communication pattern.

Hence, $\gamma_s$ is now equivalently parameterized by the communication performance profile $CPP(C, d_{cov})$ rather than the communication parameters and the neighbor node communication pattern. We can determine the set $S_{d_{cov}}$ of candidate values for $d_{cov}$ that achieve the target convergence speed and we determine the normalized coverage distance $\hat{d}_{cov}$ that minimizes the generated interference as:

$$S_{d_{cov}}(C) = \{d_{cov} \mid \gamma_s(\hat{\alpha}(C, d_{cov}), CPP(C, d_{cov})) \leq \gamma_{target}\}$$

$$\hat{d}_{cov}(C) = \arg\min_{d_{cov} \in S_{d_{cov}}(C)} (SNR_{Req}(\widehat{MCS}) \times d_{cov}^{\alpha_c} \times \rho_{occ}(\widehat{MCS}))$$

In a third phase, we determine the neighbor node communication pattern $\hat{C}$ that minimizes the interference as:

$$\hat{C} = \arg\min_C (SNR_{Req}(\widehat{MCS}) \times \hat{d}_{cov}^{\alpha_c} \times \rho_{occ}(\widehat{MCS}))$$

Hence, in this example, the reference set may comprise the reference value $\hat{\alpha}$ of the control parameter, the reference value $\hat{d}_{cov}$ of the normalized coverage distance, the reference modulation and coding scheme $\widehat{MCS}$ and the reference neighbor node communication pattern $\hat{C}$.

As previously explained, the communicating nodes 10 may locally adapt the values of the communication parameters to achieve a communication performance profile equal to or higher than the reference communication performance profile to guarantee the convergence speed. At the same time, the PDRs cannot be too high to prevent the consensus algorithm from diverging. It is thus advantageous to define a first and a second reference communication performance profiles, denoted respectively by $\overline{PDR}^-$ and $\overline{PDR}^+$, to enable some fluctuations on the PDRs while ensuring that the target convergence speed is achieved. For instance, the first reference communication performance profile $\overline{PDR}^-$ may be the communication performance profile defined as $CPP(\hat{C}, \hat{d}_{cov})$ (i.e. considering the reference value $\hat{d}_{cov}$ of the normalized coverage distance and the reference neighbor node communication pattern $\hat{C}$ determined above). The second reference communication performance profile $\overline{PDR}^+$ may be the communication performance profile defined as $CPP(\hat{C}, \hat{d}_{cov}^+)$, wherein:

$$\hat{d}_{cov}^+ = \max(d_{cov}) \mid \gamma_s(\hat{\alpha}, CPP(\hat{C}, d_{cov})) \leq \gamma_{target}$$

Hence, both the first and second reference communication performance profiles $\overline{PDR}^-$ and $\overline{PDR}^+$ satisfy the control performance criterion. The interference criterion is satisfied for the first reference communication performance profile $\overline{PDR}^-$. The constraint on the interference generated is relaxed for the second reference communication performance profile.

This approach does provide some kind of robustness to PDR fluctuations. However, in some cases, the fluctuations allowed can be considered too small, e.g. by a few tens of decibels.

We now provide another example for the determination of the first and second reference communication performance profiles. In this example, the goal is to achieve a target robustness with respect to local adaptation errors. Hence, a target robustness factor $R_{target}$ is obtained and at least one among the first reference communication performance profile and the second reference communication performance profile is determined based on said target robustness factor $R_{target}$.

The robustness factor $R$ may be seen as a measure of a distance between communication performance profiles. For instance, the communication performance profile may be characterized by their mean value (over distance), that is intuitively a relevant measure of the impact of the communication performance on the control performance. To obtain a normalized distance, the robustness factor may be defined e.g. as follows:

$$R = \frac{\frac{\overline{PDR^+}}{\overline{PDR^-}} - 1}{\frac{1}{\overline{PDR^-}} - 1}$$

wherein $\overline{PDR}$ designates the mean value of the communication performance profile PDR, i.e.

$$\overline{PDR} = \frac{1}{r}\sum_{i=1}^r PDR_i$$

with r non-zero PDR values. With this convention, R=1 if $PDR^+=1$ for all distances in the neighbor node communication pattern, and R=0 if $PDR^+=PDR^-$.

Hence, the goal is e.g. to find a first reference communication performance profile $\overline{PDR}^-$ and a second reference communication performance profile $\overline{PDR}^+$ (having a higher communication performance) that achieve the target ($\gamma_{target}$, $R_{target}$) while minimizing the average transmission power $\overline{P}_{Tx}$ for the first reference communication performance profile $\overline{PDR}^-$ (but with a value higher or equal for $P_{Tx}$ than when a single reference communication performance profile is determined according to the methods described before). It shall be mentioned that if the first reference communication performance profile $\overline{PDR}^-$ needs to be achievable, it is not the case for the second reference communication performance profile $\overline{PDR}^+$ that is only an upper bound that must not be exceeded. It is thus proposed to build a virtual second candidate communication performance profile $vPDR^+$ as follows:

$$vPDR^+ = R_{target} + (1 - R_{target}) \times PDR^-$$

The objective is now, given a target robustness factor $R_{target}$ to find the candidate communication performance profile $PDR^-$ and the candidate value of the control parameter $\alpha$ such that the control performance criterion (target convergence speed $\gamma_{target}$) is achieved for both $PDR^-$ and $vPDR^+$, still under the constraint of minimizing the average transmission power $\overline{P}_{Tx}$ for $PDR^-$. This can be accomplished in different ways. According to a non-limitative example, it is possible to modify the second phase discussed above as follows. In the second phase, for each candidate neighbor node communication pattern C and all admissible $d_{cov}$, we look for the optimal value for the control parameter $\alpha$ that achieves the target speed $\gamma_{target}$ for the first candidate communication performance profile $PDR^-(d_{cov})$ and the associated virtual second candidate communication performance profile $vPDR+$:

$$S_{(\alpha, d_{cov})}(C) =$$

$$\{(\alpha, d_{cov}) \mid \gamma_s(\alpha, PDR^-(C, d_{cov})) \leq \gamma_{target} \text{ and } \gamma_s(\alpha, vPDR^+) \leq \gamma_{target}\}$$

$$(\hat{\alpha}, \hat{d}_{cov})(C) = \arg\min_{(\alpha, d_{cov}) \in S_{(\alpha, d_{cov})}(C)} (SNR_{Req}(\widehat{MCS}) \times d_{cov}^{\alpha_c} \times \rho_{occ}(\widehat{MCS}))$$

Then, the search of the reference set may be implemented as described above. By doing so, a first reference communication performance profile $\widehat{PDR}^-$ and a second reference communication performance profile $\widehat{vPDR}^+$ are determined and distributed to the communicating nodes 10, where they are used to bound the communication performance profile.

FIG. 9 represents schematically an exemplary embodiment of a reference device 20 suitable for implementing the method 40.

In this exemplary embodiment, the reference device 20 comprises a processing circuit 21 and a wireless communication unit 22, coupled to the processing circuit 21. For instance, the processing circuit 21 comprises one or more processors and storage means (magnetic hard disk, solid-state disk, optical disk, electronic memory, etc.) in which a computer program product is stored. Alternatively, or in combination thereof, the processing circuit 21 can comprise one or more programmable logic circuits (FPGA, PLD, etc.), and/or one or more specialized integrated circuits (ASIC), and/or a set of discrete electronic components, etc. The wireless communication unit 22 comprises for instance a radiofrequency circuit comprising components (antenna(s), amplifier(s), local oscillator(s), mixer(s), analog and/or digital filter(s), etc.) considered known to the skilled person. The wireless communication unit 22 is compatible with one or more communication protocols, which may include one or more V2V communication protocols such as those defined by the ITS-G5, IEEE WAVE or 3GPP Cellular-V2X standards, etc.

The communicating nodes 10 may also comprise the same elements as the reference device 20, i.e. a processing circuit and a wireless communication unit. In particular, each communicating node 10 which is not a reference device 20 may be configured to receive, via its wireless communication unit, all or part of the reference set, and to configure its communication links based on the received information, as discussed above.

It is emphasized that the present invention is not limited to the above exemplary embodiments. Variants of the above exemplary embodiments are also within the scope of the present invention.

For instance, the present disclosure has been provided by focusing on communicating nodes 10 embedded in vehicles of a platoon of vehicles. However, the present disclosure applies also to any application in which communicating nodes 10 arranged according to a substantially regular formation are connected by wireless communication links to exchange data related to a cooperative control algorithm, such as the consensus algorithm.

The invention claimed is:

1. A method for configuring communication links between a plurality of communicating nodes, wherein the communication links are used for exchanging data related to a cooperative control algorithm, wherein the cooperative control algorithm comprises at least one control parameter, wherein the communicating nodes are arranged according to a fixed regular formation, said method comprising:

selecting, by a reference device, a candidate neighbor node communication pattern among a plurality of predetermined neighbor node communication patterns for the regular formation and a candidate value of at least one communication parameter;

determining, by the reference device, a candidate communication performance profile based on the candidate neighbor node communication pattern and on the candidate value of the at least one communication parameter;

estimating, by the reference device, a control performance level of the cooperative control algorithm based on the at least one control parameter and on the candidate communication performance profile;

estimating, by the reference device, an interference level generated by the communicating nodes when using the candidate neighbor node communication pattern and the candidate value of the at least one communication parameter;

wherein different control performance levels and different interference levels are estimated for different candidate neighbor node communication patterns and different candidate values of the at least one communication parameter until a predetermined control performance criterion and a predetermined interference criterion are both satisfied, thereby identifying a reference set having a reference neighbor node communication pattern, a reference value of the at least one communication parameter and a reference communication performance profile;

wherein all or part of the reference set is used for configuring communication links between communicating nodes.

2. The method according to claim 1, comprising further configuring the at least one control parameter by estimating different control performance levels and different interference levels for different candidate values of the at least one control parameter, wherein the reference set further comprises a reference value of the at least one control parameter used for configuring the cooperative control algorithm.

3. The method according to claim 1, wherein the candidate communication performance profile is further estimated based on a propagation model and a communication performance model.

4. The method according to claim 1, wherein at least one communicating node performs a local adaptation of the value of the at least one communication parameter in order to achieve the reference communication performance profile on the communication links of said at least one communicating node.

5. The method according to claim 1, comprising determining a first reference communication performance profile and a second reference communication performance profile for the reference set, the second reference communication performance profile having a higher communication performance, such that:

the control performance criterion is satisfied for both the first reference communication performance profile and the second reference communication performance profile; and the interference criterion is satisfied for at least the first reference communication performance profile.

6. The method according to claim 5, comprising obtaining a target robustness factor, and wherein at least one among the first reference communication performance profile and the second reference communication performance profile is determined based on said target robustness factor.

7. The method according to claim 5, wherein at least one communicating node performs a local adaptation of the value of the at least one communication parameter in order to achieve on the communication links of said at least one communicating node a communication performance profile bounded by the first reference communication performance profile and the second reference communication performance profile.

8. The method according to claim 1, comprising obtaining, by the reference device, a target convergence speed for the cooperative control algorithm, and wherein:

the estimated control performance level is an estimated convergence speed of the cooperative control algorithm;

the control performance criterion is satisfied when the estimated convergence speed is faster or equal to the target convergence speed.

9. The method according to claim 1, wherein the interference criterion is satisfied when the estimated interference level is minimized or below a predetermined threshold.

10. The method according to claim 1, wherein the cooperative control algorithm is a consensus algorithm.

11. The method according to claim 1, wherein the reference device is one of the communicating nodes.

12. A non-transitory computer-readable storage medium comprising instructions which, when executed by at least one processor, configure said at least one processor to carry out a method according to claim 1.

13. A device comprising a wireless communication unit and a processing circuit configured to carry out a method according to claim 1.

14. A communication system comprising a plurality of communicating nodes and at least one reference device according to claim 13, said at least one reference device being one of the communicating nodes or separate from said communicating nodes.

15. The communication system according to claim 14, wherein the communicating nodes are embedded in respective vehicles of a vehicle platoon.

\* \* \* \* \*